March 7, 1933.  A. LYSHOLM ET AL  1,900,120
VARIABLE SPEED POWER TRANSMISSION
Filed March 26, 1932  3 Sheets-Sheet 1
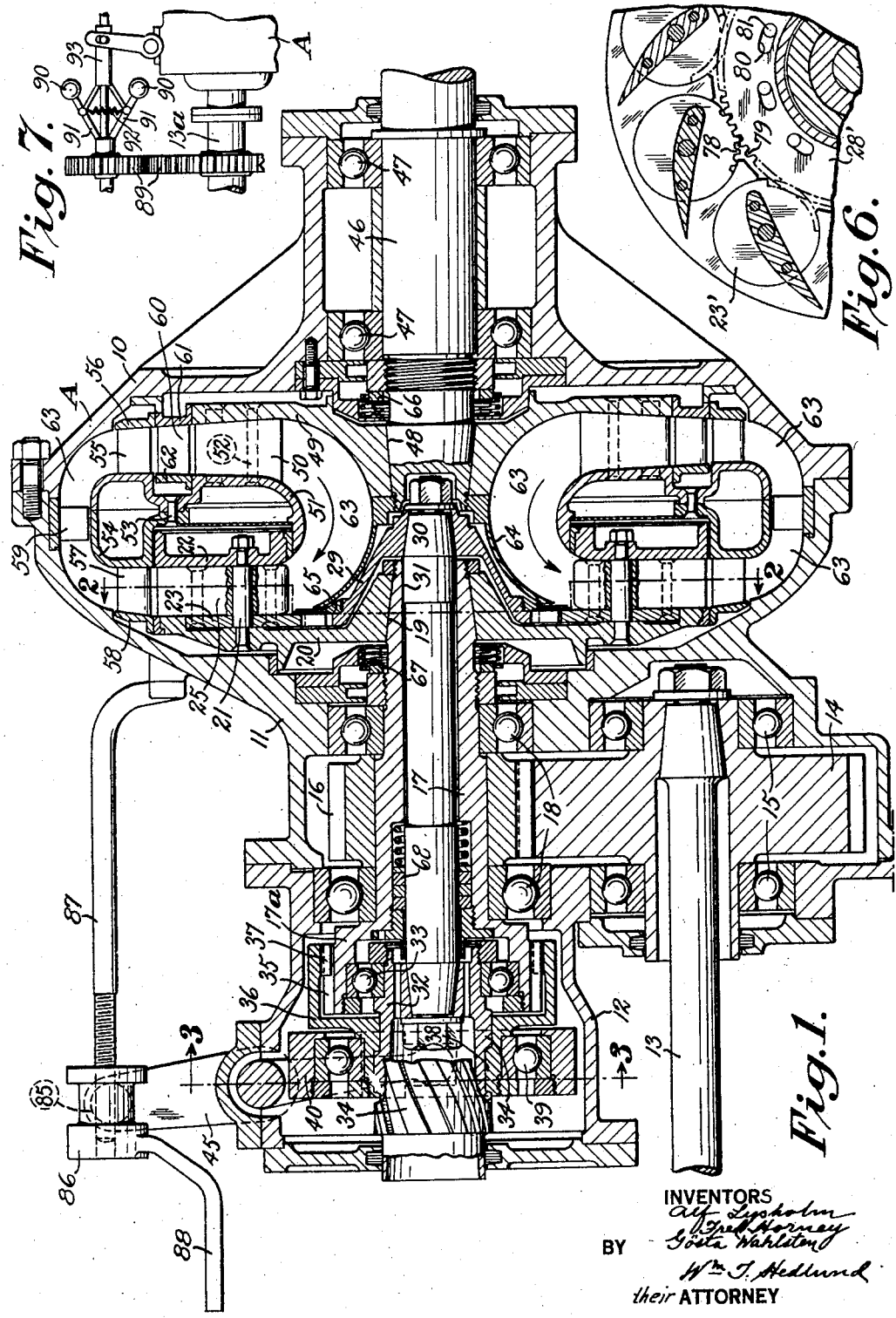
INVENTORS
Alf Lysholm
Fred Horney
Gösta Wahlsten
BY
Wm. J. Hedlund
their ATTORNEY

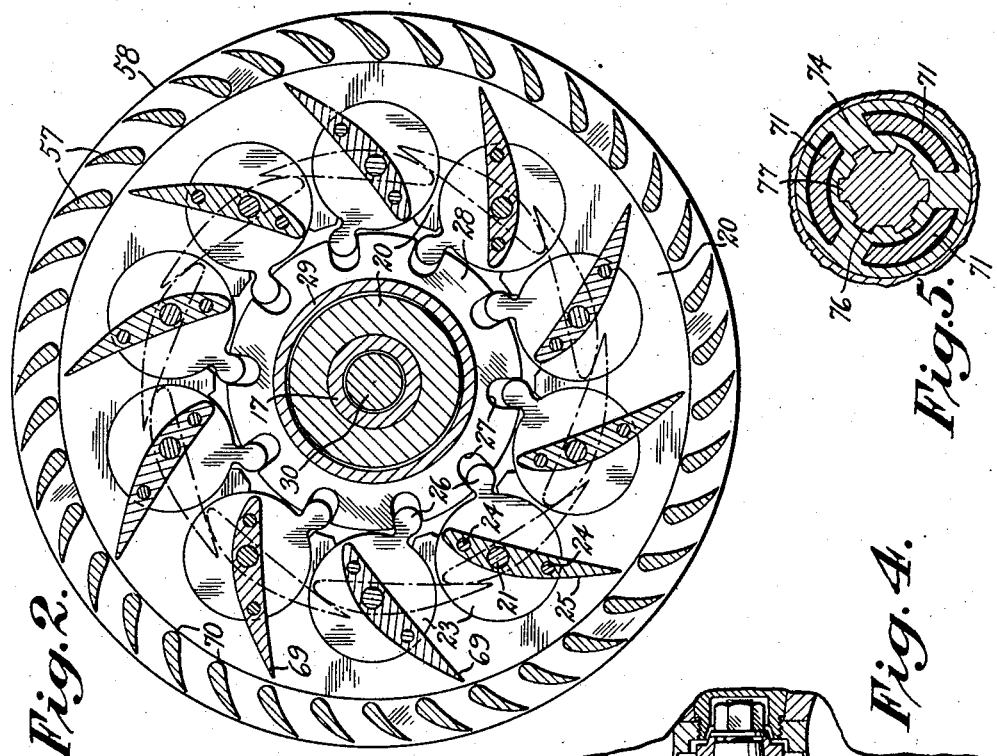

March 7, 1933.   A. LYSHOLM ET AL   1,900,120
VARIABLE SPEED POWER TRANSMISSION
Filed March 26, 1932    3 Sheets-Sheet 3
Fig. 8.
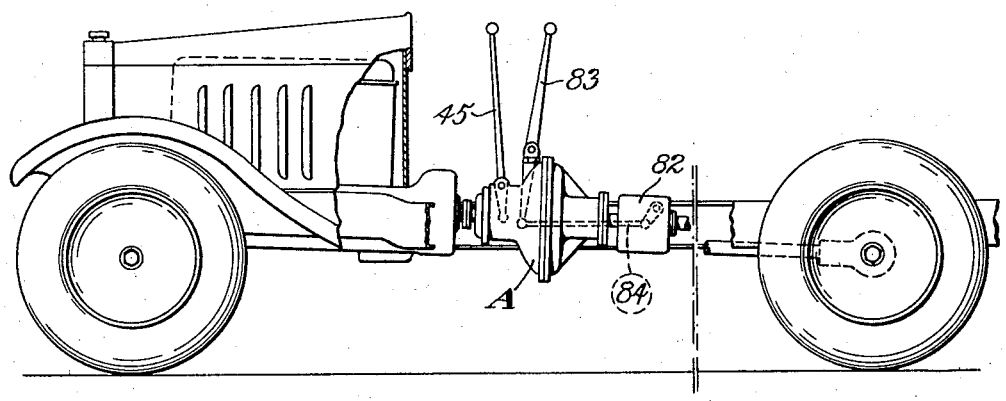
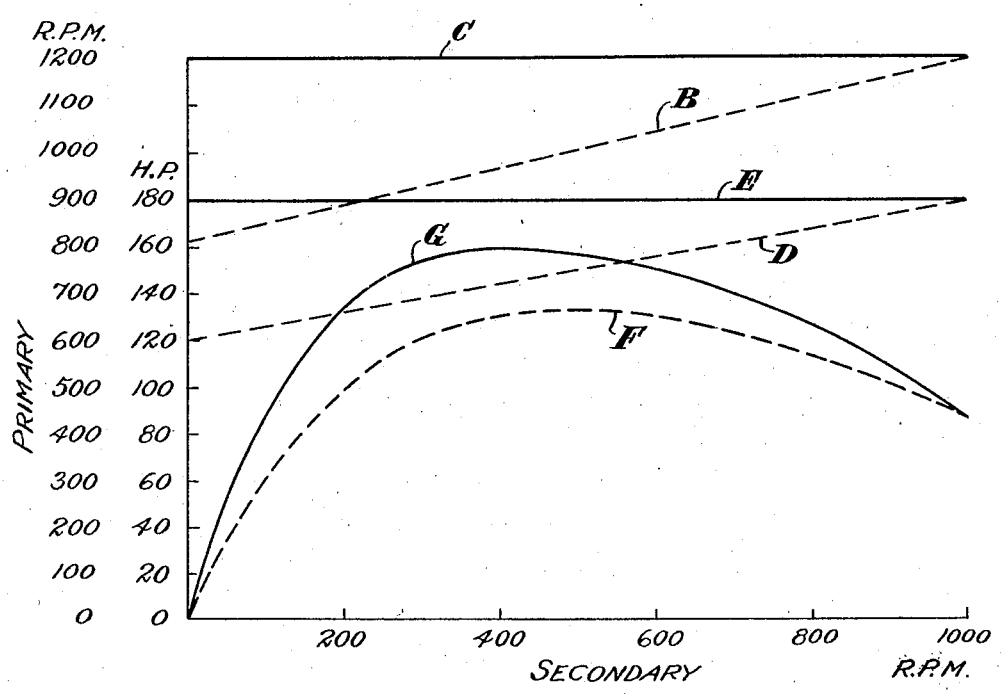
Fig. 9.
INVENTORS
Alf Lysholm
Fred Horney
Gösta Wahlstein
BY Wm. J. Hedlund
their ATTORNEY Patented Mar. 7, 1933

1,900,120

UNITED STATES PATENT OFFICE

ALF LYSHOLM, FRED HORNEY, AND GÖSTA WAHLSTEN, OF STOCKHOLM, SWEDEN, ASSIGNORS TO AKTIEBOLAGET LJUNGSTROMS ANGTURBIN. OF STOCKHOLM, SWEDEN, A JOINT STOCK COMPANY OF SWEDEN

VARIABLE SPEED POWER TRANSMISSION

Application filed March 26, 1932, Serial No. 601,330, and in Germany May 7, 1931.

The present invention relates to variable speed power transmissions and has particular reference to transmissions of the type in which an operating fluid is circulated through a closed circuit, such fluid deriving energy from a driving member comprising a pump impeller or the like and delivering energy to a driven member comprising a turbine member or the like. Water is ordinarily employed as the operating fluid in transmissions of the above type and for the purposes of the present specification, the term "hydraulic transmission" will be employed, but it is to be understood that this term is merely descriptive and is intended to include transmissions using fluids other than water for effecting the transmission of power.

It is desirable, in transmissions of the above mentioned type, to provide a structure such that the power from the driving or primary shaft of the transmission is transmitted to the secondary or driven shaft in a manner obtaining automatic adjustment of the speed ratio between the primary and secondary shafts so that under all conditions, the maximum amount of power can be transmitted to the secondary shaft from the primary shaft, having regard for the amount of power available at the primary shaft. In prior forms of transmissions of the type under consideration difficulties in securing the maximum transmission of power under all conditions have been encountered, especially at low speeds of the turbine shaft and more particularly at low speeds of the primary shaft. Under such conditions, the secondary or driven member of the transmission offers such high resistance to the flow of the operating fluid therethrough that the resistance to flow of the fluid through the primary or driving member is materially increased. As a result, the speed of the primary member is reduced to an extent such that the power available from the source driving the primary member cannot be utilized to the best advantage. This is particularly true in the case of a transmission to which power is delivered by an internal combustion engine or other form of prime mover in which the power developed decreases materially upon reduction in speed of operation of the prime mover.

The general object of the present invention is to provide an improved form of hydraulic variable speed transmission of the above described type in which the undesirable operating characteristics of prior forms of transmissions are eliminated and which will effect efficient transmission of power from a driving member to a driven member under different conditions of operation involving considerable differences in speed of these members.

In accordance with the invention, the above general object is attained by the provision of a transmission in which the impeller forming a part of the primary member of the transmission comprises blades adjustable to alter the free flow area through the impeller and in which the turbine wheel forming a part of the secondary or driven member is provided with blades which are fixed relative to this member. In a preferred embodiment of the invention, the transmission comprises a single ring of blades on the impeller, said blades being arranged to be turned about separate axes, and a plurality of rings of blades fixed with respect to the turbine member.

The axes about which the adjustable blades are adapted to be turned are preferably parallel with respect to the axis of rotation of the primary member and in order to make the blades of the turbine member, which blades are fixed relative thereto, substantially independent of the inlet angle and of the speed of flow of the operating fluid with respect to these blades, so that high efficiency is obtainable at substantially all speeds of the transmission, the fixed blades preferably have a cross-section or profile comprising a relatively thick and well rounded inlet edge or surface on the blades. In cases where the turbine member comprises a plurality of blade rings, it is most preferable that the blades of the ring through which the operating fluid first passes after leaving the blades of the impeller have profiles providing a thickened and rounded inlet edge or surface on the blades.

The more detailed nature of the invention together with the more specific objects thereof and the manner in which the several objects of the invention are attained, may best be understood from the following description of the construction and operation of preferred embodiments of the invention, taken in conjunction with the accompanying drawings forming a part of this specification.

In the drawings:

Fig. 1 is a central longitudinal section of a transmission embodying the invention;

Fig. 2 is a transverse section taken on the line 2—2 of Fig. 1;

Fig. 3 is a section taken on the line 3—3 of Fig. 1;

Fig. 4 is a central longitudinal section showing a portion of a transmission of the type shown in Fig. 1 and of somewhat different form;

Fig. 5 is a section taken on the line 5—5 of Fig. 4;

Fig. 6 is a view similar to Fig. 2 showing part of another form of transmission embodying the invention.

Fig. 7 is a diagrammatic view illustrating an automatic control for the transmission;

Fig. 8 is a more or less diagrammatic side elevation partly in section of the chassis of a self-propelled vehicle equipped with a transmission embodying the invention and, Fig. 9 is a diagram illustrating certain power characteristics.

Turning now more particularly to Figs. 1 to 3 inclusive, the transmission comprises a casing indicated generally at A, which casing may be integral or which may comprise a number of casing parts such as parts 10, 11 and 12 indicated in the figure.

The specific transmission illustrated in Fig. 1 is of the type adapted to be operated at a speed higher than the speed of the power shaft 13, which shaft is adapted to derive power from any suitable source. To this end shaft 13 is fixed to a gear 14 rotatably mounted in suitable bearings 15 in the casing member 11 and meshing with a gear 16 fixed on a hollow shaft or sleeve 17. Sleeve 17 is rotatably mounted in the casing on bearings 18 and forms a part of the primary or driving member of the transmission. One end of sleeve 17 is tapered as at 19 and has fixed thereto the disc 20. Disc 20 has fixed thereto a plurality of peripherally spaced axially extending pins 21 arranged in the form of a ring (see Fig. 2), these pins serving to support an annular ring 22 axially spaced from the disc 20. Pins 21 are preferably shouldered as indicated in Fig. 1 so as to form spacers between the ring and the disc.

Turnably mounted on each of the pins 21 is a circular plate 23 and as will be seen from Figs. 1 and 2, the plates 23 are set in recesses in the face of disc 20 so as to be flush therewith. Each of the plates 23 has fixedly secured thereto, as by means of the rivets 24, a pump impeller blade 25. Blades 25 are journalled on pins 21 and as will be seen from Fig. 1, the blades 25 extend axially across the entire space provided between the disc 20 and the ring 22.

Each of the plates 23 is provided with radially extending projection 26 adapted to project into a cooperating recess 27 in the outer radially extending flange portion 28 of a conically shaped member 29. The hub portion of member 29 is fixed to one end of shaft 30, this shaft being suitably journaled as at 31 in the sleeve 17.

At its forward end, the sleeve 17 is enlarged as at 17a and the forward end of shaft 30 has fixed thereto a member 32 which is rotatably supported with respect to the part 17a of sleeve 17 by means of the ball bearing 33. It will thus be seen that shaft 30 is radially supported within the sleeve 17 by means of the journal 31 and the ball bearing 33.

Member 32, which is shown partly in section and partly in elevation, is provided with a plurality of external helical projections 34 and the outer periphery of the part 17a is provided with a plurality of axially extending projections or teeth 35. An axially movable sleeve or collar 36 is provided at one end with internal axially extending teeth 37 engaging the slots between teeth 35 on member 17a and at the other end is provided with externally curved projections or teeth 38 adapted to engage the slots between the projections 34. The collar 36 carries a ball bearing 39 upon which is mounted a ring member 40 suitably recessed on opposite sides as at 41 (see Fig. 3) to receive the lower ends of levers 42 which extend radially from shaft 43. Shaft 43 is suitably journaled as at 44 in the casing member 12 and one end of the shaft projects through the casing and has secured thereto the operating member 45 which may conveniently be in the form of a lever.

Turning now to the driven portion of the transmission, this comprises a driven shaft 46 rotatably supported in the casing member 10 by bearings 47 and having within the casing a tapered end 48 to which is fixed the disc 49 forming a part of the turbine member or wheel of the transmission.

Disc 49 has mounted thereon a ring of axially extending blades 50 which in turn support an annular ring-like member 51 in axially spaced relation with respect to the disc 49. Members 49 and 51 and the blades in the ring 50 may be advantageously held in assembled relation by means of a series of rivets indicated at 52. Member 51 has secured thereto as by means of rivets 53 a second annular ring-like member 54. Member 51 carries a ring of blades 55 which are situated in the same transverse plane as the blades 50 and radially outside of blades 50. The ends of blades 55 opposite to the ends attached to member 51 are attached to an annular ring 56 situated in a suitable recess in the casing member 10. Member 54 carries a ring of blades 57 axially spaced from blades 55 and radially outside of the blades 25 carried by the impeller disc 20. The ends of blades 57 opposite the ends attached to member 54 are secured to a ring 58 situated in a recess in the casing member 11, one face of the ring 58 preferably being substantially flush with the corresponding face of the disc 20.

A ring of fixed guide blades 59 is carried by the transmission casing axially between the rings of blades 57 and 55 and the casing member 10 has fixed therein a second ring of guide blades 60, the ends of which are secured to the annular rings 61 and 62. As will be observed from Fig. 1, the members 51 and 54 provide an annular recess in which is situated the ring 22 and it will further be evident from the figure that the arrangement of the blade rings and the carrying parts associated therewith provides within the casing of the transmission a channel for circulation and recirculation of motive fluid serially through the various blade rings of the impeller and turbine members. This channel indicated at 63 may be said to be generally of the form of a hollow torus and the parts forming the wall surfaces thereof are advantageously made so as to make the wall surfaces as smooth and uninterrupted as possible. To this end the shaft 46 has advantageously secured thereto, adjacent to the hub portion of the disc 49, a curved annular guide member 64 surrounding the hub portion of the member 29. Obviously, the member 64 can be formed as an integral part of the member 49. The member 29 also is preferably provided with an annular guide ring 65 which provides a cover for the recesses 27 in the flange portion 28 of this member.

The space 63 is sealed against leakage of the motive fluid therefrom by a spring seated packing ring and expansible bellows device 66, the ring seating against a suitable collar on shaft 46, and a similar device 67 seating against a suitable collar on sleeve 17. Leakage between the shaft 30 and sleeve 17 is prevented by means of a stuffing box comprising packing rings 68.

In the above described structure it will be evident that the disc 20 and ring 22, together with the associated parts rotating therewith, constitute a pump or impeller. It will also be observed that the disc 49, the ring elements 51, 54, 56 and 58 and the three rows of blades 50, 55 and 57, which rotate together and in fixed relationship with respect to each other, constitute a turbine member or wheel.

The operation of the transmission is as follows; assuming the space 63 to be filled with a suitable operating fluid such as water. Sleeve 17 is rotated through the medium of shaft 13 and gears 14 and 16, thus causing rotation of the disc 20. Rotation of this disc carries with it the pins 21 and consequently the blades 25. Assuming the blades 25 to be in a position such as shown in full lines in Fig. 2, the operating fluid is forced radially outwardly by the blades and circulates through the space 63 in the direction of the arrows in Fig. 1. The energy imparted to the fluid is extracted during its passage through the turbine blade rows 57, 55 and 50 in the order named. Admission of the fluid to the rows 55 and 50 at the desired inlet angle is effected by the rows of guide blades 59 and 60 fixed to the turbine casing.

Except as the mechanism is adjusted to vary the position of blades 25, the shaft 30 and member 29 carried thereby, rotate without relative rotation with respect to the sleeve 17, and the blades are maintained in fixed position of rotation about their axes. In order to move the blades 25 about their axes, ring 40 is shifted axially, which movement, due to the straight and curved teeth on members 17a, 32 and 36, causes relative rotational movement of member 29 with respect to the disc 20. As will be evident from Fig. 2, such relative rotational movement between these parts will cause turning movement of the plates 23 and consequent turning movement of the blades 25 about their axes. For example, if the lever 45 is moved to the right in Fig. 1 so as to cause shifting of the sleeve 36 to the left in the figure, this movement will cause the shaft 30 and member 29 to rotate in clockwise direction with respect to the sleeve 17 and disc 20, when viewed from the right of Figure 1 or as seen in Fig. 2. This movement, as will be evident from Fig. 2, will cause the blades 25 to be moved from the full line positions shown in the figure toward the dotted line positions indicated therein, the amount of movement depending upon the amount of movement of the lever 45. If movement of lever 45 is continued as far as possible in the direction tending to close the blades, it will be evident that the blades may be moved to the positions shown in Fig. 2 in dot-and-dash lines. When in this position, the blades form a closed annular ring which may be rotated without resistance except for the relatively slight amount of resistance due to friction between the moving parts and the operating fluid, which under this condition is not circulated. It will thus be evident that, if desired, the movable impeller blades can be utilized to fulfill the functions of a clutch, since with the blades in the position shown in dot-and-dash lines, the load on the engine or other source of power is so small as to be neglectable in practical operation.

The shifting of the position of the blades 25 will operate to alter the free flow area for operating fluid through the ring of pump blades and will also operate to vary the radial distance between the discharge edges 69 of the pump blades and the inlet edges 70 of the first row of blades 57 on the turbine wheel. By thus varying the sectional area for free flow of fluid, the speed of the primary member or impeller may be made independent of the quantity of fluid pumped, so that the speed of the impeller may be adjusted to permit the prime mover to operate at a speed at which it can develop the desired amount of power.

Preferably, the blades are pivoted, as shown in Fig. 2, about axes coinciding with or adjacent to the lines representing the center of pressure on the blades, so that the minimum amount of force is required to effect turning movement of the blades or to hold the blades in their several positions of adjustment.

It will further be evident from Fig. 2 that with different speeds of the impeller relative to the turbine wheel and with different positions of adjustment of the impeller blades, the fluid flowing to the ring of blades 57 will impinge the blades at different relative inlet angles, and in order to secure substantially uniform efficiency in spite of such variation in the relative inlet angle of flow with respect to these blades, we prefer to make them of the general type illustrated, that is, with relatively thick and well rounded inlet surfaces. The relative inlet angle of admission of the fluid to the succeeding rows of turbine blades 55 and 50 will also vary with variations in speed of the turbine wheel and the blades of these rows are advantageously made of the same general character as that of the blades in the row 57. It is more important, however, that the blades 57 be of the type illustrated since the relative inlet angle with respect to these blades will vary through a wider range than will the relative inlet angle with respect to the remaining rows of turbine blades.

Turning now to Fig. 4, we have illustrated another embodiment of the invention in which the primary member of the transmission is operated at the speed of the prime mover. In the arrangement shown in this figure, the impeller and turbine wheel construction is like that previously described and therefore need not be again described in detail. The sleeve 17′ of the primary member is in this instance provided with three axially extending fingers 71 (Fig. 5) at its forward end to which is secured by means of the intermediate collar 72 the driving plate 73 adapted to be secured to the shaft supplying power to the transmission. Fingers 71 project through suitable slots in an annular member 74 outside of which is mounted the shift ring 75. Ring 75 is relatively rotatable with respect to member 74 and is adapted to be shifted axially by means of levers 42′ on shaft 43′. The inner circumference of member 74 is provided with a series of axially curved slots 76 engaging correspondingly curved projections 77 on the forward portion of shaft 30′. Sleeve 17′ and shaft 30′ have secured thereto, respectively, disc 20 and member 29, these members being similar to those shown in Fig. 1. As will be largely obvious from Fig. 4, axial shifting of the ring 75 and member 74 will cause relative rotational movement between shaft 30′ and sleeve 17′ to alter the position of rotation of the blades 25 about the pins 21 in the manner already described.

As will be evident from the foregoing description, the specific structure by means of which rotational movement of the blades about their axes may be varied considerably. Thus, for example, as illustrated in Fig. 6, the plates 23′ may be provided with gear teeth 78 meshing with cooperating teeth 79 on the flange portion 28′ of member 29. In this form of construction it is preferable to provide the flange portion 28′ with one or more peripherally extending slots 80 in which are situated pins 81 fixed in the disc 20 of the impeller, these pins and slots serving to limit the turning movement of member 29 with respect to said disc and consequently to limit the turning movement of the blades. As shown in Fig. 6, the impeller blades are in positions providing for maximum flow of operating fluid through the impeller, and it will be evident from the figure that by moving the part 28′ in clockwise direction, as viewed in the figure, to bring the pins 81 to the opposite ends of slots 80, the blades may be turned to a position corresponding to the dot-and-dash positions for the impeller blades shown in Fig. 2.

Other modifications with respect to structural features may also be made within the scope of the invention. For example, it will be readily appreciated that turning movement of the discs carrying the impeller blades may be effected through relative longitudinal movement between parts such as shaft 30 and sleeve 17.

Various different means may be provided for effecting movement of the control lever 45. Thus, in an automotive installation such as is diagrammatically illustrated in Fig. 8, the lever 45 may be extended to provide a conveniently located manual control and the position of the lever may be fixed by means of any suitable friction or quadrant device of well known type. It will be appreciated that, insofar as the present invention is concerned, the specific constrution of the driven portion of the device to which the turbine wheel 49 is secured may be changed in any desired manner to suit individual installations. For example, in the type of installation indicated in Fig. 8, reversal of the direction of drive to the driving wheels of the vehicle may be effected by any suitable form of reversing gear indicated generally at 82 and controlled through the lever 83 connected thereto by means of the linkage 84. The driven member of the transmission may advantageously have associated therewith a reversing mechanism of the type disclosed in our copending application, Serial No. 585,440 filed January 8, 1932. The remainder of the structure shown in Fig. 8 is conventional and need not be described in detail.

Another form of control may be of the type shown in Fig. 1 in which the lever 45 terminates in a pin 85 adapted to engage a groove in a block 86 threaded on a suitable fixed bar 87 and provided with a handle 88 by means of which the block is adapted to be rotated to secure the desired axial movement thereof for shifting the position of lever 45.

The arrangement, according to the present invention is adapted for automatic as well as manual control, for example, as indicated diagrammatically in Fig. 7.

When automatic control is employed, such control may be made responsive either to the speed of the secondary member of the transmission or to the speed of the primary member. Generally speaking, the latter arrangement, which is indicated in the figure, is to be preferred. In the event that automatic control is employed, it is preferable to so arrange it that the speed of the primary member may be maintained constant. To this end any suitable arrangement may be employed. By way of example, we have indicated the use of a conventional centrifugal governor driven from the power shaft 13a through the medium of gears 89. In the illustrated form of governor, the usual weights 90 mounted on the pivoted levers 91 are adapted to fly outwardly under the influence of centrifugal force and against the action of spring 92 to move the sleeve 93 axially to the left of the figure upon increase in speed of the shaft 13a. The transmission indicated in the figure is of the type shown in Fig. 4 and it will be evident that this movement will operate to increase the free flow area through the impeller upon increase in speed of the driving shaft and to decrease this area when the speed of the driving shaft drops. Obviously, other equivalent arrangements employing different types of known speed responsive devices may be employed with equal facility.

Turning now to Fig. 9, we have illustrated therein by means of suitable curves, the differences in operating characteristics between a transmission embodying the present invention and other types of transmissions. In the coordinate system of the figure, abscissæ represent the speed of the secondary or driven member of the transmission, in revolutions per minute, while the ordinates represent, for some curves, the speed of the primary member in revolutions per minute and for other of the curves the power transmitted. The broken line B indicates the speed of the primary shaft in a transmission in which the blades in the pump impeller are not adjustable and it shows that for low speeds of the secondary member, the speed of the primary member will be considerably lower than at higher speeds of the secondary member. In other words, the line B shows that with non-adjustable blades, the speed of the primary member will vary with the speed of the secondary member. This is due to the fact that when a given amount of power is transmitted from the primary to the secondary member, the turbine wheel will offer a greater resistance to flow of the operating fluid at low speeds of the secondary member than at high speeds thereof. Consequently, resistance developed in the impeller member is also increased and this increase in resistance in the impeller member results in a reduction in the speed of the prime mover. If, under low speed conditions, the blades of the impeller are shifted to decrease the flow area through the pump impeller, the pump will, for the same speed, deliver a smaller quantity of operating fluid and the resistance to flow in the turbine wheel will be correspondingly reduced. This will enable the pump impeller to rotate at a higher speed and thus permit the prime mover to develop a greater amount of power. The full line C indicates how the speed of the primary member or impeller may be controlled so as to keep this speed constant if desired, when adjustable impeller blades are employed and the position of the blades is adjusted so that the free flow area through the impeller is increased as the speed of the secondary member increases and conversely is decreased upon a decrease in the speed of the secondary member.

The broken line D illustrates the variation in the power available at the primary element of the transmission, due to the variations in speed thereof, when the impeller blades are not adjustable, while the full line E illustrates the constant amount of power available when adjustable blades are employed and the speed of the primary member is maintained constant under varying conditions as indicated by curve C. The broken line curve F indicates the power transmitted to the secondary or driven member of the transmission under varying speed conditions when the primary member of the transmission does not comprise adjustable blades, while the full line curve G indicates the power transmitted to the secondary member of the transmission when the primary member thereof is provided with adjustable blades.

It will be evident from the above curves that more power can be made available at the primary member of the transmission at low speeds when the impeller is provided with adjustable blades than can be made available under similar conditions with a pump member having non-adjustable blades. The adjustment of the blades is ordinarily required only when the speed of the secondary member falls below what may be considered a normal value, tending to reduce the speed of the impeller to a value causing an undesirable drop in the amount of power available at the primary member. For higher speeds of the secondary member, the proper position of the pump blades will be the position which the blades would have if they were non-adjustable. In the curves shown in Fig. 9, this position is reached at a speed of the secondary shaft of a thousand revolutions per minute.

From the foregoing description, it will be obvious that many different changes may be made in the specific details of the transmission structure and in the manner of its application to self-propelled vehicles without departing from the scope of the invention. While we have shown a transmission incorporated in the chassis of an automobile by way of example, it will be understood that transmissions of the character to which the present invention relates are suitable for heavier types of duty such for example as in the propulsion of rail cars, locomotives and the like. The invention is, therefore, not to be considered as limited in any way to the structures herein disclosed by way of example but is to be considered as embracing all such structures as may fall within the scope of the appended claims when they are construed as broadly as is consistent with the state of the prior art.

What is claimed is:

1. A hydraulic variable-speed power transmission comprising a non-rotatably mounted casing providing a chamber for operating fluid, a primary member comprising a shaft part rotatably mounted in the casing and an impeller part in said chamber, a secondary member having a shaft part rotatably mounted in said casing in axial alignment with the first mentioned shaft part and a turbine part in said chamber, said impeller part and said turbine part having a plurality of rings of blades arranged for circulation of operating fluid in a closed path of flow in said chamber outwardly through a ring of impeller blades and through a ring of turbine blades situated outwardly of said impeller blades and inwardly through a second ring of turbine blades, said rings of turbine blades comprising blades fixed on said turbine part to provide fixed channels for flow of operating fluid therebetween, said ring of impeller blades comprising blades pivotally mounted on said impeller part and mechanism operable from the exterior of the casing for turning the pivotally mounted blades to alter the free area of the passages for flow of operating fluid therebetween.

2. A hydraulic variable-speed power transmission comprising a non-rotatably mounted casing providing a chamber for operating fluid, a primary member comprising a shaft part rotatably mounted in the casing and an impeller part in said chamber, a secondary member having a shaft part rotatably mounted in said casing in axial alignment with the first mentioned shaft part and a turbine part in said chamber, said impeller part and said turbine part having a plurality of rings of blades arranged for circulation of operating fluid in a closed path of flow in said chamber outwardly through a ring of impeller blades and through a ring of turbine blades situated outwardly of said impeller blades and inwardly through a second ring of turbine blades, guide blades fixed in said casing between adjacent rings of turbine blades and providing fixed channels for flow of operating fluid between the guide blades, said rings of turbine blades comprising blades fixed on said turbine part to provide fixed channels for flow of operating fluid between the turbine blades, said ring of impeller blades comprising blades pivotally mounted on said impeller part and mechanism operable from the exterior of the casing for turning the pivotally mounted blades to alter the free area of the passages for flow of operating fluid therebetween.

3. A hydraulic variable-speed power transmission comprising a non-rotatably mounted casing providing a chamber for operating fluid, a primary member comprising a hollow shaft part rotatably mounted in the casing and an impeller part in said chamber, a secondary member having a shaft part rotatably mounted in said casing in axial alignment with said hollow shaft part and a turbine part in said chamber, said impeller part comprising a disc and a ring of impeller blades pivotally mounted with respect to the disc and said turbine part comprising a plurality of rings of fixed turbine blades, said rings of blades being arranged for circulation of operating fluid in a closed path of flow in said chamber outwardly through said ring of impeller blades and through a ring of turbine blades situated outwardly of said impeller blades and inwardly through a second ring of turbine blades, and mechanism for turning said pivotally mounted blades about their axes comprising a shaft movably mounted in said hollow shaft part, parts operatively connecting the inner end of said shaft with said pivotally mounted blades to turn the same upon movement of said shaft relative to said hollow shaft part and means operable from the exterior of said casing for causing relative movement of said shaft with respect to said hollow shaft part.

4. A hydraulic variable-speed power transmission comprising a non-rotatably mounted casing providing a chamber for operating fluid, a primary member comprising a hollow shaft part rotatably mounted in the casing and an impeller part in said chamber, a secondary member having a shaft part rotatably mounted in said casing in axial alignment with said hollow shaft part and a turbine part in said chamber, said impeller part comprising a disc and a ring of impeller blades pivotally mounted with respect to the disc and said turbine part comprising a plurality of rings of fixed turbine blades, said rings of blades being arranged for circulation of operating fluid in a closed path of flow in said chamber outwardly through said ring of impeller blades and through a ring of turbine blades situated outwardly of said impeller blades and inwardly through a second ring of turbine blades, and mechanism for turning said pivotally mounted blades about their axes comprising a shaft turnably mounted in said hollow shaft part, parts operatively connecting the inner end of said shaft with said pivotally mounted blades to turn the same upon turning movement of said shaft relative to said hollow shaft part and means operable from the exterior of said casing for causing relative turning movement of said shaft with respect to said hollow shaft part.

5. A hydraulic variable-speed power transmission comprising a non-rotatably mounted casing providing a chamber for operating fluid, a primary member comprising a shaft part rotatably mounted in the casing and an impeller part in said chamber, a secondary member having a shaft part rotatably mounted in said casing in axial alignment with the first mentioned shaft part and a turbine part in said chamber, said impeller part and said turbine part having a plurality of rings of blades arranged for circulation of operating fluid in a closed path of flow in said chamber outwardly through a ring of impeller blades and through a ring of turbine blades situated outwardly of said impeller blades and inwardly through a second ring of turbine blades, said rings of turbine blades comprising blades fixed on said turbine part to provide fixed channels for flow of operating fluid therebetween, and the turbine blades first receiving operating fluid from the impeller blades being of substantially greater thickness at the inlet edges of the blades than at the outlet edges thereof and having bluntly rounded inlet edges, said ring of impeller blades comprising blades pivotally mounted in said impeller part and mechanism operable from the exterior of the casing for turning the pivotally mounted blades to alter the free area of the passages for flow of operating fluid therebetween.

6. A hydraulic variable-speed power transmission comprising a non-rotatably mounted casing providing a chamber for operating fluid, a primary member comprising a shaft part rotatably mounted in the casing and an impeller part in said chamber, a secondary member having a shaft part rotatably mounted in said casing in axial alignment with the first mentioned shaft part and a turbine part in said chamber, said impeller part and said turbine part having a plurality of rings of blades arranged for circulation of operating fluid in a closed path of flow in said chamber outwardly through a ring of impeller blades and through a ring of turbine blades situated outwardly of said impeller blades and inwardly through a second ring of turbine blades, guide blades fixed in said casing between adjacent rings of turbine blades and providing fixed channels for flow of operating fluid between the guide blades, said rings of turbine blades comprising blades fixed on said turbine part to provide fixed channels for flow of operating fluid between the turbine blades, said turbine blades and said guide blades being of substantially greater thickness at the inlet edges of the blades than at the outlet edges thereof and having bluntly rounded inlet edges, said ring of impeller blades comprising blades pivotally mounted on said impeller part and mechanism operable from the exterior of the casing for turning the pivotally mounted blades to alter the free area of the passages for flow of operating fluid therebetween.

7. A hydraulic variable-speed power transmission comprising a non-rotatably mounted casing providing a chamber for operating fluid, bearings in said casing to each side of said chamber, a primary member comprising a hollow shaft part rotatably mounted in one of said bearings and an impeller part in said chamber, a secondary member having a shaft part rotatably mounted in another of said bearings in axial alignment with said hollow shaft part and a turbine part in said chamber, said impeller part and said turbine part having a plurality of rings of blades arranged for circulation of operating fluid in a closed path of flow in said chamber outwardly through a ring of impeller blades and through a ring of turbine blades situated outwardly of said impeller blades and inwardly through a second ring of turbine blades, packing means for each of said shaft parts located between the bearing for the shaft part and said chamber, said ring of impeller blades comprising blades pivotally mounted on said impeller part, mechanism comprising an element movable in said hollow shaft part and operable from the exterior of the casing for turning the pivotally mounted blades to alter the free area of the passages for flow of operating fluid therebetween, and packing means between said hollow shaft part and said element.

8. In a hydraulic variable-speed transmission of the character described, a non-rotatably mounted casing providing a chamber for operating fluid and a primary member comprising a hollow shaft part rotatably mounted in said casing and an impeller part having a ring of turnably mounted impeller blades thereon, said impeller part being fixed to said hollow shaft part and situated within said chamber, packing means between said casing and said hollow shaft part for preventing leakage of operating fluid from said chamber around said shaft part, a shaft turnably mounted in said hollow shaft part, means located in said chamber for operatively connecting the inner end of said shaft part with said ring of blades for turning the same upon turning movement of said shaft with respect to said hollow shaft part, packing means between said shaft and said hollow shaft part for preventing leakage of operating fluid therebetween from said chamber and mechanism located outside of said packing means for causing relative turning movement of said shaft with respect to said hollow shaft part.

9. In a variable-speed hydraulic transmission of the type having a non-rotatably mounted casing providing a chamber for operating fluid and impeller and turbine members having rings of blades arranged in said chamber for circulation of operating fluid in a closed path in the chamber, an impeller member comprising a hollow shaft part rotatably mounted in said casing, a disc part fixed to the shaft part and located in said chamber, a ring of axially extending pins on said disc part, a ring supported by said pins in axially spaced relation with respect to said disc, plates turnably mounted on said pins and situated in recesses in the face of said disc, impeller blades secured to said plates and turnably mounted on said pins, and mechanism comprising a shaft extending through said hollow shaft part into said chamber and a member fixed to the shaft part and engaging said plates for turning the impeller blades about said pins due to relative turning movement between said shaft and said hollow shaft part.

10. In a hydraulic variable-speed power transmission, an impeller member comprising a shaft part adapted to be rotatably mounted in a casing, a disc-like rotor part adapted to be located in a chamber for operating fluid, a ring of plates situated in recesses in one face of said disc-like rotor part, a ring of pins fixed in said disc-like rotor part and projecting therefrom, said discs being turnable about said pins, a plurality of impeller blades each turnably mounted on one of said pins and fixed to one of said plates, an actuating member radially inside said ring of plates, said actuating member and said plates having cooperating projections and recesses adapted to cause turning movement of the actuating member relative to said rotor part to turn said plates about said pins and said actuating member having an annular shield arranged to cover the ends of said projections and recesses on the blade side of the rotor part to provide a relatively smooth surface for flow of operating fluid past said projections and recesses.

11. In a hydraulic variable-speed power transmission, an impeller member comprising a shaft part adapted to be rotatably mounted in a casing, a disc-like rotor part adapted to be located in a chamber for operating fluid, a ring of circular plates having gear teeth thereon and situated in recesses in one face of said disc-like rotor part, a ring of pins fixed in said disc-like rotor part and projecting axially therefrom, said plates being turnable about said pins, a plurality of impeller blades each turnably mounted on one of said pins and fixed to one of said plates, an actuating member radially inwardly of said ring of plates, said actuating member having gear teeth cooperating with the gear teeth on said plates to turn said plates about said pins upon turning movement of the actuating member relative to said rotor part and said actuating member having an annular shield adapted to cover the ends of said gear teeth on the blade side of the rotor part to provide a relatively smooth surface for flow of operating fluid past the gear teeth.

In testimony whereof we have affixed our signatures.

ALF LYSHOLM.
FRED HORNEY.
GÖSTA WAHLSTEN.